United States Patent [19]

Nelle et al.

[11] Patent Number: 4,982,508

[45] Date of Patent: Jan. 8, 1991

[54] POSITION MEASURING DEVICE

[75] Inventors: Günther Nelle, Bergen; Walter Schmitt, Traunreut; Reinhold Schopf, Altenmarkt; Josef Weiss, Traunreut, all of Fed. Rep. of Germany

[73] Assignee: Dr. Johannes Heidenhain GmbH, Traunreut, Fed. Rep. of Germany

[21] Appl. No.: 370,273

[22] Filed: Jun. 22, 1989

[30] Foreign Application Priority Data

Jun. 29, 1988 [DE] Fed. Rep. of Germany ....... 3821860
Jul. 16, 1988 [DE] Fed. Rep. of Germany ....... 3824194
Feb. 25, 1989 [DE] Fed. Rep. of Germany ....... 3905897

[51] Int. Cl.$^5$ ............................................. G01B 11/04
[52] U.S. Cl. ........................................ 33/702; 33/707
[58] Field of Search ................ 33/DIG. 19, 702, 703, 33/704, 705, 706, 707, 708

[56] References Cited

U.S. PATENT DOCUMENTS 4,728,232 3/1988 Babel ................................. 33/702 X
4,831,737 5/1989 Grund ................................... 33/702

FOREIGN PATENT DOCUMENTS 3437196 5/1986 Fed. Rep. of Germany ........ 33/702

Primary Examiner—Harry N. Haroian
Attorney, Agent, or Firm—Toren, McGeady & Associates

[57] ABSTRACT

A position measuring device including a scale carrier member and a scanning device for scanning the scale. A temperature difference is generated between the scale carrier member and/or the scanning device, on the one hand, and a housing surrounding the scale carrier member and the scanning device, on the other hand. The temperature difference ensures that condensate is always precipitated on the colder housing.

56 Claims, 8 Drawing Sheets

POSITION MEASURING DEVICE

BACKGROUND OF THE INVENTION

1. Field of the Invention

The present invention relates to a position measuring device including a scale carrier member and a scanning device for scanning the scale. The position measuring device may particularly be of the enclosed type.

2. Description of the Related Art

Position measuring devices of the above-described type may be length measuring devices or angle measuring devices which operate in accordance to various physical principles. See, for example, U.S. Pat. Nos. 4,490,915 and 4,731,930.

Position measuring devices of this type are used in machines for determining the relative positions of two or more structural machine components.

If position measuring devices are used in humid surroundings, for example, in so-called processing centers, there is a great danger, even if the position measuring device is of the enclosed type, that moisture vapors penetrate into the interior even due to the smallest leaks. When temperature variations occur, the vapors may condensate and be deposited in an uncontrolled manner, so that temperature variations may negatively influence the operation of the position measuring device.

It is, therefore, the primary object of the present invention to provide a position measuring device which is not susceptible to trouble and ensures high measuring accuracy.

SUMMARY OF THE INVENTION

In accordance with the present invention, a position measuring device of the above-described type includes means for generating a temperature difference or drop between the scale carrier member and/or the scanning device, on the one hand, and the immediate surrounding of the above-mentioned structural components, on the other hand.

In accordance with a feature of the present invention, the scale carrier member and the scanning device are surrounded by a housing. In this case, the temperature difference is created between the scale carrier member and the scanning device, on the one hand, and the housing, on the other hand.

The position measuring device according to the present invention has the particular advantage that the temperature difference between the scale carrier member and the scanning device, on the one hand, and the housing, on the other hand, always has the result that condensate will be deposited on the colder housing, so that the sensitive scale and the scanning device remain free of precipitation.

Many additional features according to the present invention shall be described below. The type of application will determine which of these features will be used in the position measuring device.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

DESCRIPTION OF THE PREFERRED EMBODIMENTS

Figure 1:
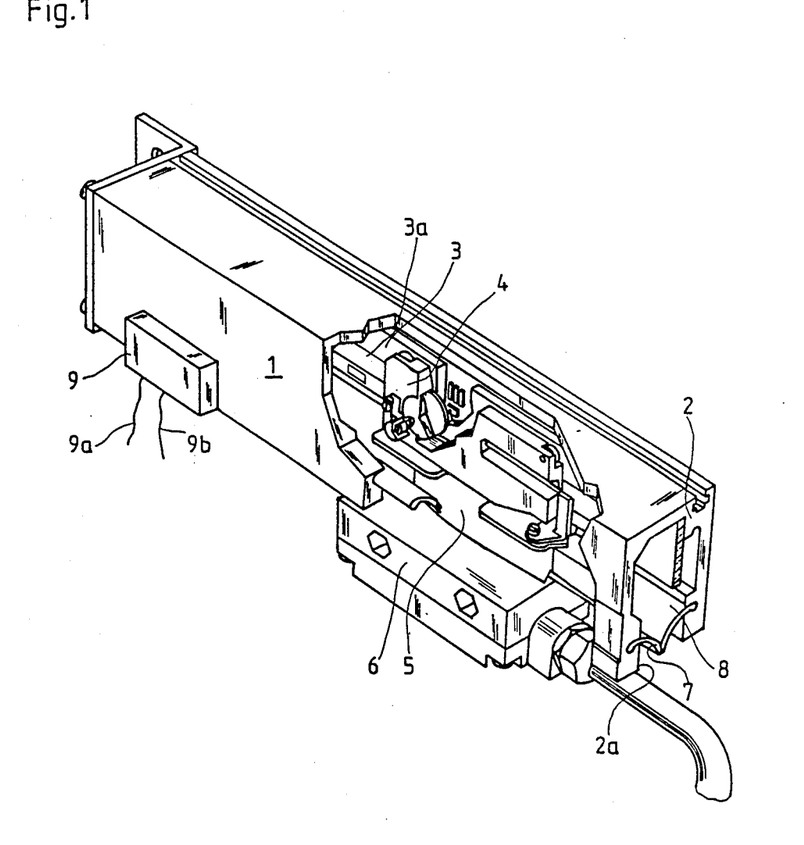
FIG. 1 is a perspective view of a length measuring device with a thermocouple.

FIG. 1 of the drawing shows a length measuring device 1 which includes a housing 2 of light metal in which is fastened in the known manner a scale carrier member 3. In FIG. 1, a portion of the housing 2 is broken away, so that a scanning device 4 is visible. The scanning device 4 scans a scale 3a which is mounted on the scale carrier member 3. The scanning is carried out photoelectrically in the known manner. A drive member 5 which has the cross-sectional shape of a two-sided sword connects the scanning device 4 and an assembly base 6. The drive member 5 extends through a longitudinal slot 2a in the housing 2 which is sealed off by means of roof-like sealing lips 7 and 8.

In a machine, not shown, in which the displacements between machine bed and carriage are to be measured, the scanning device 4 is mounted on the machine bed through assembly base 6 and drive member 4, and housing 2 with the scale carrier member 3 is mounted on the carriage.

As mentioned above, due to even the finest leaks, moisture penetrates into the interior of the housing 1 which is essentially enclosed to all sides. If temperature changes occur in the vicinity of the position measuring device 1, the moisture vapor can condensate and be deposited in an uncontrolled manner on the scale carrier member 3 or on the scanning device 4. The condensate represents an impurity for the structural component required for the operation of the position measuring device 1 and, thus, leads to problems.

A cold pole is created on the housing 2 by means of a thermocouple 9 which preferably is a Peltier element. The condensate is formed in the vicinity of this cold pole. As a result, moisture is deposited on the housing 2 at a desired location, so that no harmful dew can be formed on the scale carrier member 3 and the scanning device 4.

The required energy is supplied to the Peltier element 19 through connecting wires 9a and 9b.

Figure 2:
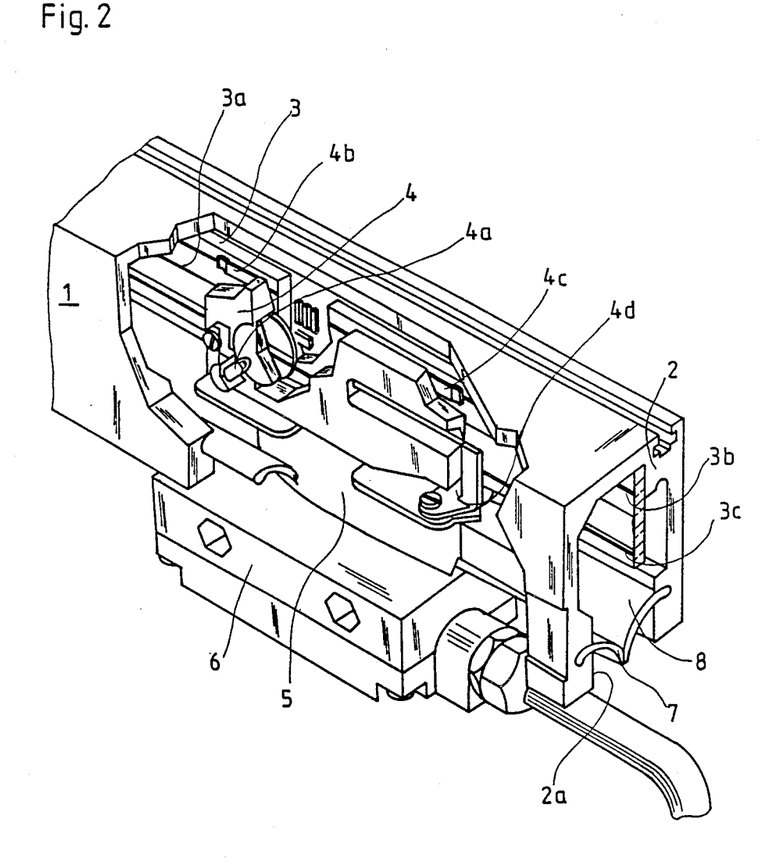
FIG. 2 is a perspective view, on a larger scale, of the length measuring device of FIG. 1, illustrated with heating lines on the scale carrier member.

FIG. 2 of the drawing shows a portion of the position measuring device 1 of FIG. 1 on a larger scale. However, in the device shown in FIG. 2, the temperature difference between the structural components of the position measuring device 1 is created differently.

In this embodiment and the following embodiments, the same component or components carrying out the same function are each provided with the same reference numerals in order to keep the number of reference numerals low and in order to facilitate a comparison of the individual embodiments.

Contrary to the embodiment of FIG. 1 in which the housing 2 is being cooled, in the embodiment of FIG. 2, the structural components to be protected from dew, such as, scale carrier member 3 and the scanning device 4, are heated slightly.

Heating is effected by means of heating lines 3b, 3c which are vapor deposited on the carrier member 3 in addition to the scale 3a. It is understood that the scale carrier member 3 is of glass or ceramic material. If, on the other hand, the scale carrier member 3 is made of an electrically conductive material, such as metal, an electrically insulating intermediate layer must be provided between the scale carrier member 3 and the heating lines 3b, 3c. However, the intermediate layer should not impair the heat transfer from the heating lines 3b, 3c to the scale carrier member 3.

Current flows through the heating lines 3b, 3c. In accordance with a feature of the invention which is not illustrated, the heating lines 3b, 3c can be integrally melted into the scale carrier 3.

Current may be supplied to heating lines 3b, 3c in many different ways. In FIG. 2, sliding contacts 4b, 4c, 4d are shown on the scanning device 4. A preferably regulated heating current is supplied to the heating lines 3b, 3c though the sliding contacts 4b, 4c, 4d. Instead of the sliding contacts 4b, 4c, 4d it is also possible to use ball bearings for the current transmission, wherein the ball bearings can simultaneously be used for guiding the scanning device 4 on the scale carrier member 3. An inductive transmission of the heating current is also possible.

Figure 3:
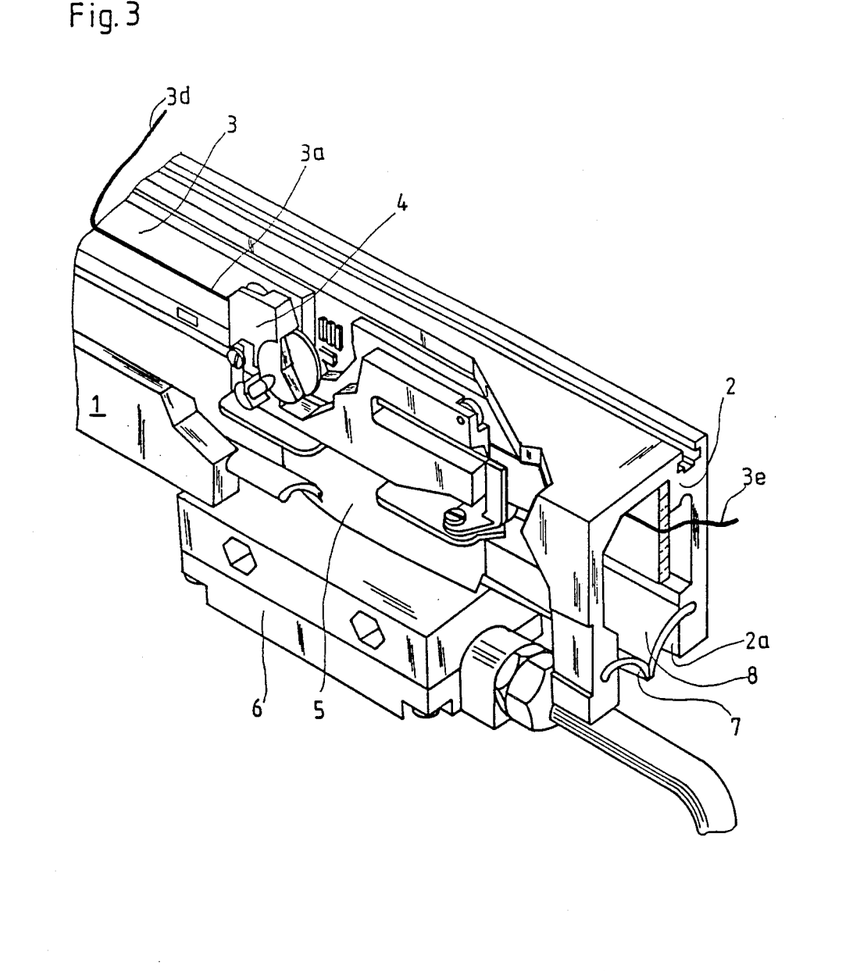
FIG. 3 is a perspective view of a length measuring device with a scale as heating element.

FIG. 3 of the drawing shows an embodiment in which a temperature difference is created by current flowing through the scale 3a proper. Scale 3a may be, for example, of chromium and is vapor-deposited on the carrier member 3. Current is supplied through special supply lines 3d, 3e which may be fastened to the scale carrier member 3 in a manner similar to the manner known from heatable rear windows of automobiles.

If the heating current is to be regulated, it is useful to vapor deposit temperature-dependent sensing resistors on the scale carrier member 3. This procedure may be carried out, as is true for applying the heating lines, already during the manufacture of the scale. This feature has not been illustrated in the drawing.

It is apparent that the dimensions of the scale carrier member 3 change when it is being heated. This effect can be taken into consideration in various ways. One possibility resides in manufacturing the scale carrier member 3 slightly below the intended dimension, so that it reaches its desired length in the heated state. Another possibility is to use an appropriate heating control for adjusting the expansion of the scale carrier member 3 to the temperature-related expansion of the machine on which the position measuring device 1 is mounted. In accordance with a further development of this method, a non-linear error correction can be effected by partially different heating of the scale carrier member 3.

Figure 5:
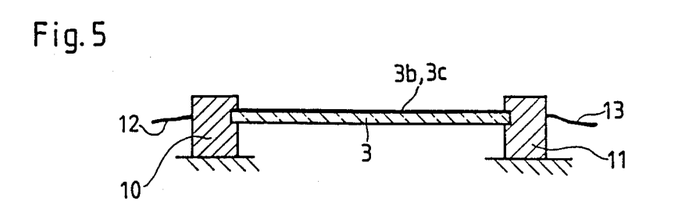
FIG. 5 is a sectional view of a fixedly mounted scale carrier member.

In accordance with another possibility for taking into consideration the temperature-related changes due to heating, the scale carrier member 3 is tightly connected to the machines by means of fastening elements 10, 11, so that the machine-dependent dimensional changes are imparted to the scale carrier member 3 in such a way that the changes due to heating have no effect. This type of fastening of the scale carrier member 3 is schematically shown in FIG. 5. In accordance with an advantageous feature, in this type of fastening, the current can be supplied to the heating lines 3b, 3c through the fastening elements 10 and 11 which are connected to an energy source, not shown, through supply lines 12 and 13.

Figure 4:
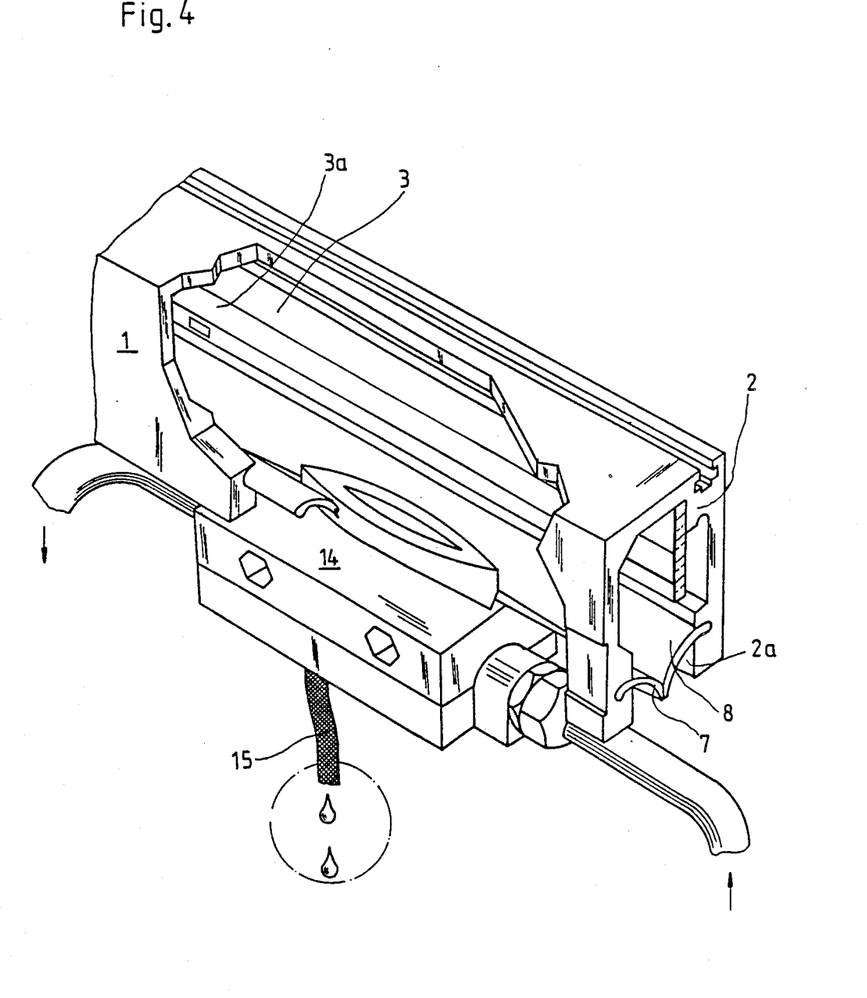
FIG. 4 is a perspective view of a length measuring device with a condensation space.

FIG. 4 of the drawing shows an embodiment of the invention in which the housing 2, or a hollow condensation space 14 connected to the housing 2, is maintained cooler than the scale carrier member 3 or the scanning device which is not shown in this figure. The space 14 is connected to the interior of the housing 2. Since the same vapor pressure prevails in the two hollow spaces, any moisture which exceeds the saturation point in the cooler condensation space 14 is condensated in the space 14. As a result, a lower relative humidity prevails in the interior of the housing 2.

A moisture exchanger should be provided in the hollow space 14. The moisture exchanger can discharge the condensated moisture by means of its exchanger surface to dryer external air. Such a moisture exchanger by be a wick which is permeable to moisture but essentially impermeable to air. In order to illustrate the discharge of the condensated moisture to the ambient air by means of the wick, FIG. 4 shows droplets within a dash-dotted circle. However, this illustration does not mean that the moisture is discharged in the form of droplets. Rather, the moisture will evaporate.

The hollow condensation space 14 may be cooled by means of different measures. In the embodiment illustrated in FIG. 4, cooling liquid flows as indicated by arrows through the hollow condensation space 14 from the coolant circulation system of the machine.

However, as shown in FIG. 1, a cooling by means of Peltier elements is also possible.

Essentially all types of coolants can be used for cooling, for example, $CO_2$ snow or the like.

A hollow condensation space 14 as it is shown in FIG. 4 in conjunction with a position measuring device 1 can also be connected to several position measuring devices. In that case, the structural expenses are substantially reduced.

In addition to moisture exchanges, the condensate may also be chemically or physically bound by means of exchangeable elements, for example, silica gel capsules.

Figure 6:
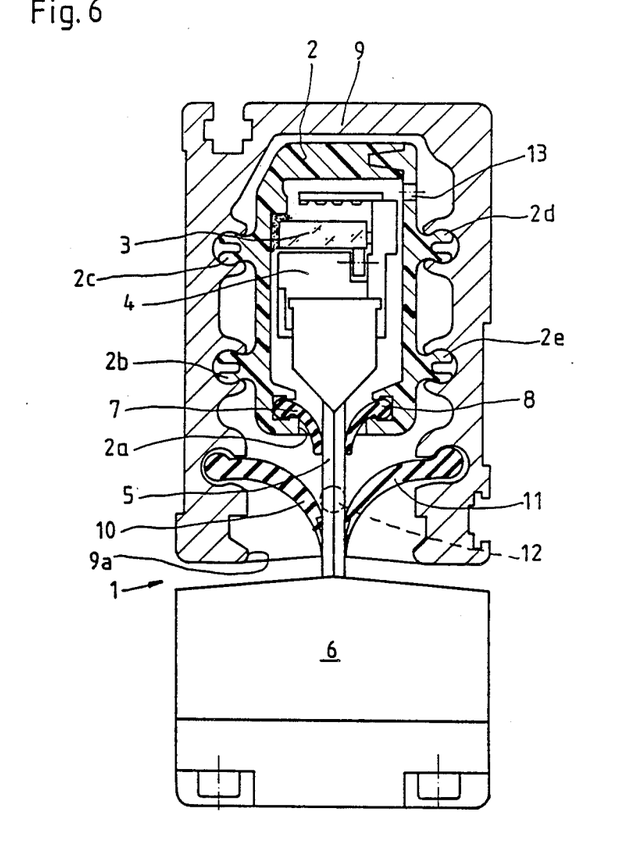
FIG. 6 is a cross-sectional view of a length measuring device with a double housing.

The length measuring device 1 illustrated in FIG. 6 includes an inner housing 2 in which a scale carrier member 3 is fastened in the known manner. FIG. 6 shows the inner housing 2 in cross-section and further shows a scanning device 4 in the inner housing 2. The scanning device 4 photoelectrically scans a scale, not shown, in the known manner. The scale is mounted on the scale carrier member 3. A drive member 5 having the cross-sectional shape of a two-sided sword connects the scanning device 4 with an assembly base 6. The drive member 5 extends through a longitudinal slot 2a in the inner housing 2 which is sealed off by means of sealing lips 7 and 8. The sealing lips 7 and 8 are arranged to form the shape of a V.

An outer housing 9 surrounds the inner housing 2 which is fastened in the interior of the outer housing 9 through support elements 2b, 2c, 2d, 2e. Additional sealing lips 10 and 11 close off a longitudinal slot 9a of the outer housing 9. The sealing lips 10 and 11 are also arranged to form the shape of a V and the drive member 5 also extends through the sealing lips 10 and 11.

The arrangement of the sealing lips 7, 8 and 10, 11 is frequently also described as roof-like. Of course, this description depends upon the position in which the position measuring device 1 is mounted.

In accordance with a feature of the present invention, the two housings 2 and 9 are made of different materials whose thermal conductivity coefficients differ from each other as much as possible. Housing 2 should have a thermal conductivity coefficient which is as small as possible and housing 9 should have a thermal conductivity coefficient which is as great as possible. For this reason, the inner housing 2 is of fiber-reinforced plastics material and the outer housing 9 is of aluminum.

In a machine, not shown, in which the displacements between a machine bed and a carriage are to be measured, the scanning device 4 is mounted on the machine bed through assembly bed 6 and drive member 5, and the housings 2 and 9 with the scale carrier member 3 are mounted on the carriage.

As mentioned above, due to even the finest leaks, moisture penetrates into the interior of the position measuring device 1 which is essentially closed to all sides. When temperature variations occur in the vicinity of the position measuring device 1, the moisture vapor may condensate and be deposited in an uncontrolled manner on the scale carrier member 3 or on the scanning device 4. The condensate represents an impurity for the structural components which are significant for the operation of the position and, thus, may lead to problems.

The double housing according to the present invention substantially reduces the danger of moisture depositing on the scale carrier member 3 and the scanning device 4. For example, when the ambient temperature in the vicinity of the position measuring device 1 drops and the air in the interior of the device is almost saturated, the inner surfaces of the outer housing 9 will very quickly assume the lower outer temperature because of the high thermal conductivity of the outer housing 9. Subsequently, the air between the outer housing 9 and the inner housing 2 is cooled, the moisture of the now oversaturated air is deposited on the inner surfaces of the outer housing 9 and flows off to the outside. In order to ensure the flow-off, openings 12 are provided in the outer housing 8 at suitable locations. A vapor pressure difference is created between the interior of the inner housing 2 and the space between the housings 2 and 9, which, however, is again compensated by means of small openings 13 in the inner housing 2. Due to the smaller thermal conductivity of the inner housing 2, the vapor content in the inner housing 2 decreases more quickly than the temperature, so that no oversaturated air can be created in the interior of the inner housing 2 which would lead to moisture being deposited on the scale carrier member 3 and/or the scanning device 4.

The two pairs of sealing lips 7, 8 and 10, 11 ensure a good mechanical protection against ambient influences including spray water.

The support elements 2b, 2c, 2d, 2f are constructed in such a way that the inner housing 2 can be inserted in the housing 9, while the relative position of the two housings can then no longer be easily changed. The support elements and the recesses for receiving the support elements are interrupted in longitudinal direction of the housing, so that the flow of condensate is not impaired.

Figure 7:
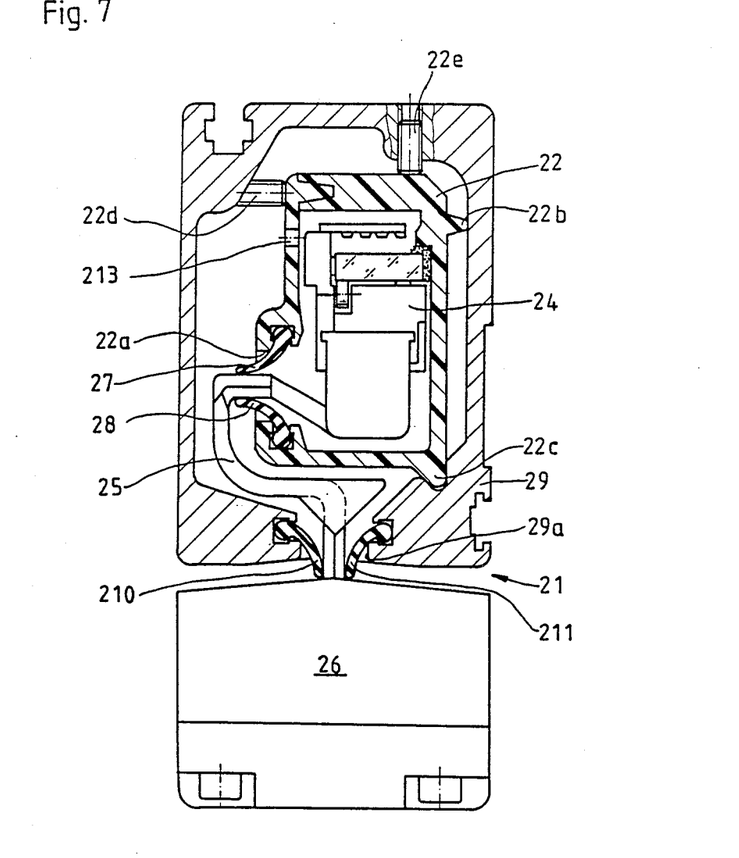
FIG. 7 is a cross-sectional view of a measuring device similar to FIG. 4.

FIG. 7 of the drawing shows an embodiment of the position measuring device according to the present invention which differs from the one shown in FIG. 6. Reference numerals have only been entered where features differ from FIG. 6. In the position measuring device 21 shown in FIG. 7, an inner housing 22 has a longitudinal slot 22a whose position is turned by about 90° relative to a longitudinal slot 29a in an outer housing 29. The longitudinal slots 22a and 29a are sealed off by means of sealing lips 27, 28 and 210, 211. A drive member 25 which connects a scanning device 24 with an assembly element 26 has several bent portions in order to extend through the longitudinal slots 22a and 29a. The inner housing 22 is supported through projections 22b and 22c on inner surfaces of the outer housing 29 and the position of the inner housing 22 may be adjustable within certain limits by means of adjusting screws 22d and 22e. Openings 213 are provided for a vapor pressure compensation.

Instead of the openings 13 and 213, other housing openings may be provided for vapor pressure compensation. In accordance with a feature which is not illustrated, one or both end pieces of the inner housings 2 or 22 may be omitted.

Outer housing 29 has no openings for discharging the condensate because, in this embodiment, the condensate drops off through the sealing lips 210, 211. However, additional openings may also be provided in this embodiment. Because of the non-aligned arrangement of the two longitudinal slots 22a and 29a, the protection from ambient influences is particularly great. Thus, the penetration of moisture has been made even more difficult.

In this connection, an aligned arrangement is understood to be the arrangement in which the longitudinal slots are located on a straight line one behind the other in a direction from the assembly element to the scanning device, as illustrated in FIG. 6.

Figure 8:
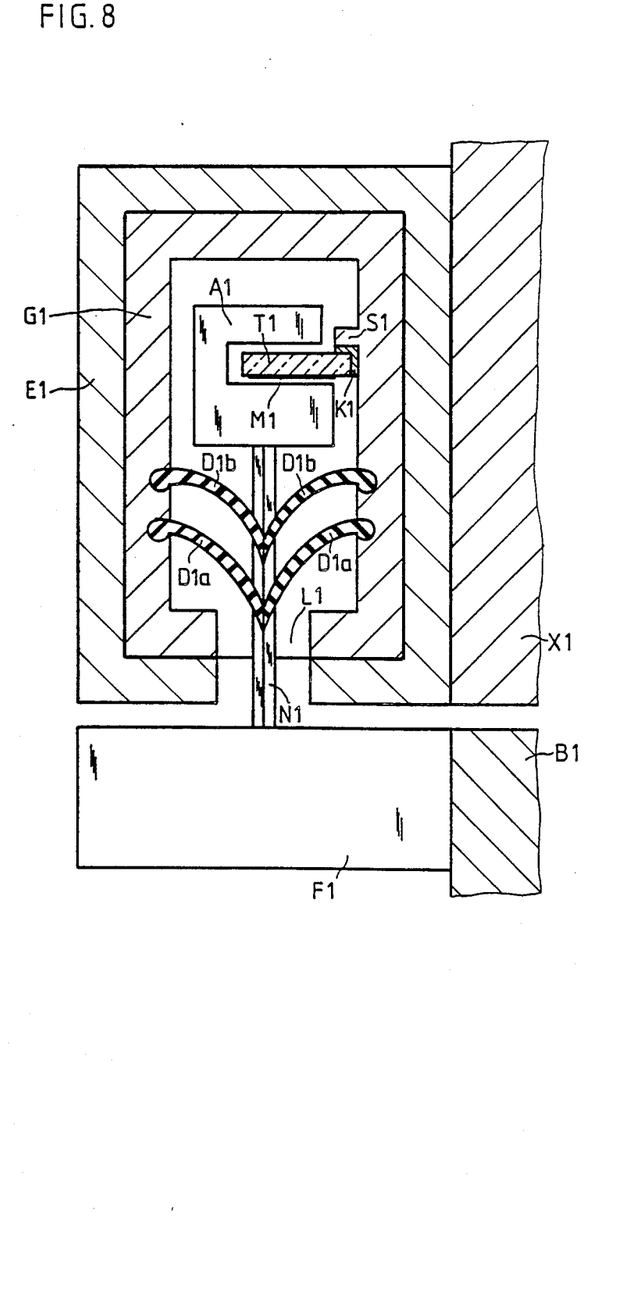
FIG. 8 is a cross-sectional view of an enclosed length measuring device with an insulating unit.

FIG. 8 of the drawing is a cross-sectional view of an enclosed length measuring device. In this embodiment, a carrier member T1 with a scale M1 is fastened on a web S1 by means of an adhesive layer K1 in the interior of a housing G1 in the form of a hollow section which is completely closed to all sides. The scale M1 is scanned in the known manner, for example, photoelectrically by a scanning device A1. The housing G1 has a longitudinal slot L1 which is closed by means of two roof-like inclined flexible pairs of sealing lips D1a, D1b. A drive member N1 in the form of a double-sided sword-like member for connecting the scanning unit A1 with an assembly base F1 extends through the sealing lips D1a, D1b.

Except for the region of the longitudinal slot L1, the housing G1 is completely surrounded by a thermal insulating unit E1 in the form of an outer insulating layer and is fastened, for example, at both ends thereof by means of fastening angles to a carriage X1 of a processing machine, not shown, as described, for example, in German Pat. No. 25 05 585. The assembly base F1 can be connected to the bed B1 of the processing machine in any chosen manner; carriage X1 and bed B1 represent the two objects whose relative position is to be measured.

As mentioned above, it is not possible to entirely prevent small leakages between the two pairs of sealing lips D1a, D1b, particularly in the region of the two cutting edges of drive member N1, so that moisture penetrates into the interior of the housing G1 when the position measuring device is used in humid surroundings. When temperature variations occur, the moisture vapors may condensate and be deposited in an uncontrolled manner on the scale M1 and/or the scanning device A1. Thus, this condensate represents an impurity to the structural components of the position measuring device which are important to the measuring operation and can negatively influence the measuring safety and the measuring accuracy to such an extent that it is no longer acceptable in high-precision position measuring devices.

By providing the thermal insulating layer E1, drops in the temperature of the immediate surroundings of the position measuring device cannot affect the interior of the housing G1, so that a temperature difference exists between the scale M1 and the scanning device A1 in the interior of the housing G1 and the immediate surroundings outside of the housing G1. Since the temperature in the interior of the housing G1 is essentially maintained during temperature variations in the surroundings, no harmful condensate of the moisture vapors is formed in the interior of the housing G1.

In order to increase this thermal insulating effect, the drive member N1 is of a material having a very low thermal conductivity, for example, of a fiber-reinforced plastics material; moreover, in addition to the outer pair of sealing lips D1a, an inner pair of sealing lips D1b is provided which further reduces the possibility of moisture vapors penetrating into the interior of the housing G1.

In accordance with another feature, the thermal insulating unit E1 may also be provided as an inner insulating layer, not shown, on the inner surfaces of the housing G1 for preventing changing thermal effects between the interior of the housing G1 and the surroundings. Furthermore, the housing G1 proper may be of thermally insulating, fiber-reinforced plastics material to form the thermal insulating unit E1.

Figure 9:
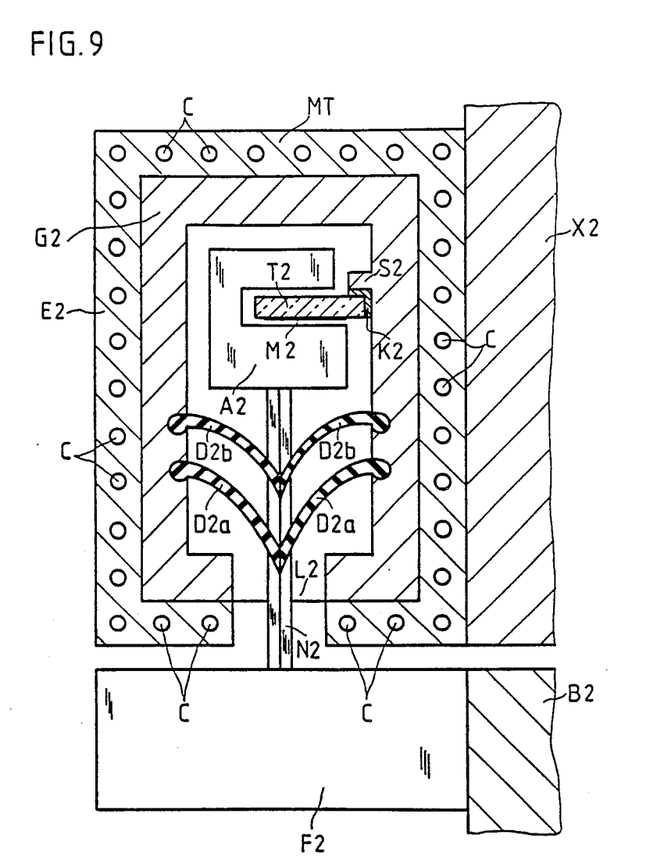
FIG. 9 is a cross-sectional view of a length measuring device with a temperature adjusting unit.

FIG. 9 of the drawing is a cross-sectional view of an enclosed length measuring device which has the same structural components as the length measuring device shown in FIG. 8 and, therefore, is provided with the same reference numerals; however, the number 1 is replaced by the number 2 in the reference numerals.

Housing G2 is placed in thermal contact in a trough-like temperature adjusting unit E2 which, in turn, is fastened to a carriage X2 of the processing machine. This temperature adjusting unit E2 includes a U-shaped middle portion MT whose bottom and walls are provided with bores C which extend in longitudinal direction and plate-shaped end portions ETa, ETb are placed in contact with both ends of the middle portion MT. The end portions ETa, ETb each have a collection bore SBa, SBb for the bores C of the middle portion MT. A liquid whose temperature is regulated is supplied to the collection bore SBa in one end portion ETa and, after flowing through the bores C of the middle portion MT, the liquid is discharged from the collection bore SBb of the other end portion ETb, as shown in FIG. 10.

By providing the temperature adjusting unit E2, temperature drops in the immediate vicinity of the positioning measuring device can also not affect the interior of the housing G2, so that a temperature difference exists between the scale M2 of the scanning device A2 in the interior of the housing G2 and the immediate vicinity outside of the housing G2. Since the temperature in the interior of the housing G2 remains constant even if the temperature in the vicinity changes, no harmful condensate formation of the moisture vapors occurs in the interior of the housing G2.

Figure 10:
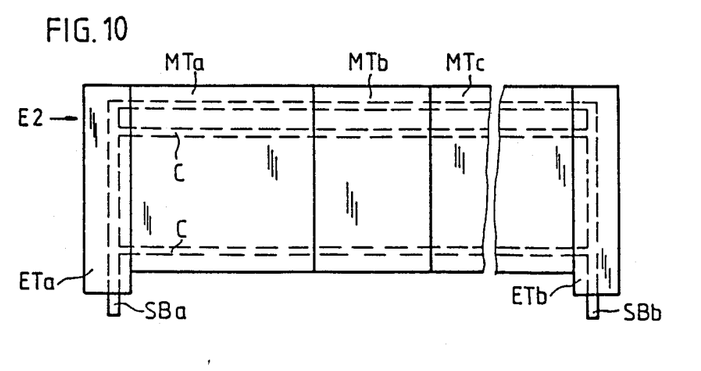
FIG. 10 is side view of the temperature adjusting unit.

As can be further seen in FIG. 10, the middle portion MT may be composed of several individual pieces MTa, MTb, MTc, . . . , wherein the individual pieces may particularly have different lengths, so that the middle portion can be easily adjusted to position measuring devices of different lengths.

In accordance with a feature which is not illustrated, the temperature adjusting unit may simultaneously form the housing for the scale and the scanning device.

Liquid may also be conducted alternatingly in different directions through the bores C of the middle portion MT or the individual pieces MTa, MTb, MTc. For this purpose, the end portions ETa, ETb may each have two collection bores SBa, SBb for the supply and the discharge of the liquid.

The thermal insulating unit E1 may also be composed of individual pieces which particularly may have different lengths. Moreover, the insulating unit E1 may also be composed of an inner insulating layer and an outer insulating layer.

The features of the present invention may be used in so-called open position measuring device as well as in enclosed position measuring devices, each of which operate in accordance with different physical measuring principles.

While specific embodiments of the invention have been shown and described in detail to illustrate the application of the inventive principles, it will be understood that the invention may be embodied otherwise without departing from such principles.

We claim:

1. In a position measuring device including a scale carrier member for a scale and a scanning device for scanning the scale, the improvement comprising means for generating a temperature difference between one of the scale carrier member and the scanning device, on the one hand, and the immediate surrounding of the scale carrier member and the scanning device, on the other hand, for producing a condensate.

2. The position measuring device according to claim 1, wherein the means for generating the temperature difference comprises heating means for the scale carrier member.

3. The position measuring device according to claim 2, wherein the scale carrier member comprises heating lines for supplying heating energy.

4. The position measuring device according to claim 1, wherein the means for generating the temperature difference comprises heating means for the scanning device.

5. The position measuring device according to claim 1, wherein the means for generating a temperature difference is a heating line in the scale.

6. The position measuring device according to claim 2, wherein the heating means comprises means for adjusting the dimensions of the scale carrier member.

7. The position measuring device according to claim 4, wherein the scanning device comprises heating lines, and sliding contacts for supplying heating current to the heating lines.

8. The position measuring device according to claim 2, the heated scale carrier member having ends, comprising fastening elements for tightly clamping the ends of the scale carrier member.

9. The position measuring device according to claim 8, comprising supply lines for supplying the heating current through the fastening elements.

10. The position measuring device according to claim 1, comprising means for enclosing the position measuring device.

11. The position measuring device according to claim 10, wherein the means for enclosing the position measuring device is a housing, the means for generating the temperature difference being cooling means for the housing.

12. The enclosed position measuring device according to claim 11, wherein the cooling means comprises at least one thermocouple for creating at least one cold pole on the housing.

13. The enclosed position measuring device according to claim 12, wherein the thermocouple is a Peltier element.

14. The enclosed position measuring device according to claim 11, wherein the housing defines at least one cooled condensation space.

15. The enclosed position measuring device according to claim 14, wherein the condensation space is adapted to be cooled by a coolant circulation system of a machine on which the position measuring device is mounted.

16. The enclosed position measuring device according to claim 14, comprising at least one Peltier element for cooling the condensation space.

17. The enclosed position measuring device according to claim 14, wherein the condensation space includes means for cooling the space by means of $CO_2$ snow.

18. The enclosed position measuring device according to claim 11, comprising a moisture exchanger on the housing.

19. The enclosed position measuring device according to claim 14, comprising a moisture exchanger in the condensation space.

20. The enclosed position measuring device according to claim 18, wherein the moisture exchanger is a wick.

21. The enclosed position measuring device according to claim 19, wherein the moisture exchanger is a wick.

22. The enclosed position measuring device according to claim 10, comprising means for chemically binding condensate produced by the temperature difference.

23. The enclosed position measuring device according to claim 10, comprising means for physically binding condensate produced by the temperature difference.

24. The enclosed position measuring device according to claim 23, wherein the means for physically binding the condensate comprises exchangeable silica gel capsules.

25. The enclosed position measuring device according to claim 14, wherein a single condensation space is provided for a plurality of position measuring devices.

26. The enclosed position measuring device according to claim 10, wherein the means for enclosing the position measuring device comprises an inner housing having a low thermal conductivity and an outer housing having a high thermal conductivity.

27. The enclosed position measuring device according to claim 26, wherein the inner housing is of plastic material and the outer housing is of aluminum.

28. The enclosed position measuring device according to claim 26, wherein the inner housing defines openings for compensating vapor pressures between the inner housing and the outer housing.

29. The enclosed position measuring device according to claim 26, wherein the outer housing defines openings for discharging condensate.

30. The enclosed position measuring device according to claim 26, wherein the inner housing and the outer housing comprise longitudinal slots, sealing lips being arranged in the shape of a V for sealing the longitudinal slots, and a drive member extending through the longitudinal slots for connecting the scanning device to an assembly member.

31. The enclosed position measuring device according to claim 30, wherein the longitudinal slots are arranged in alignment with each other, wherein the drive member extending through the longitudinal slots is a straight member.

32. The enclosed position measuring device according to claim 30, wherein the longitudinal slots are offset at an angle relative to each other, wherein the drive member extending through the sealing lips is a member which is bent several times.

33. The enclosed position measuring device according to claim 26, the outer housing having an interior, the inner housing having fastening elements for fastening the inner housing to the interior of the outer housing.

34. The enclosed position measuring device according to claim 33, wherein the fastening elements comprise projections on the inner housing and adjusting screws on the outer housing for contacting the inner housing.

35. The position measuring device according to claim 1, wherein the means for generating the temperature difference comprises a thermal insulating unit.

36. The position measuring device according to claim 1, wherein the means for generating the temperature difference comprises a temperature adjusting unit.

37. The position measuring device according to claim 35, comprising a housing for the carrier member including the scale and for the scanning device, wherein the thermal insulating unit is an outer insulating layer which surrounds the housing.

38. The position measuring device according to claim 35, comprising a housing for the carrier member including the scale and for the scanning device, wherein the thermal insulating unit is an inner insulating layer on inner surfaces of the housing.

39. The position measuring device according to claim 35, wherein the thermal insulating unit comprises a housing for the carrier member including the scale and for the scanning device, wherein the housing has a low thermal conductivity.

40. The position measuring device according to claim 36, wherein the temperature adjusting unit comprises a U-shaped middle portion having two ends and bores extending in longitudinal direction, plate-shaped end portions arranged at the two ends of the middle portion, each end portion defining at least one collection bore, wherein the temperature adjusting unit surrounds a housing for the carrier member including the scale and for the scanning device.

41. The position measuring device according to claim 36, wherein the temperature adjusting unit forms a housing for the carrier member including the scale and for the scanning device.

42. The position measuring device according to claim 36, wherein the temperature adjusting unit is composed of several individual members.

43. The position measuring device according to claim 37, wherein the housing defines a longitudinal slot, two pairs of sealing lips being provided for sealing the longitudinal slots, a drive member of a material having a low thermal conductivity for the scanning device extending through the sealing lips.

44. The position measuring device according to claim 40, wherein the housing defines a longitudinal slot, two pairs of sealing lips being provided for sealing the longitudinal slots, a drive member of a material having a low thermal conductivity for the scanning device extending through the sealing lips.

45. The position measuring device according to claim 35, wherein the thermal insulating unit is composed of several individual members.

46. The position measuring device according to claim 45, wherein the individual members have different lengths.

47. The position measuring device according to claim 40, comprising means for conducting liquid through the bores of the middle portion such that the liquid flows through the bores alternatingly in different directions.

48. In a position measuring device including a scale carrier member for a scale and a scanning device for scanning the scale, the improvement comprising means for generating a temperature difference between the scale carrier member and the scanning device, on the one hand, and the immediate surrounding of the scale carrier member and the scanning device, on the other hand, for producing a condensate.

49. The position measuring device according to claim 48, wherein the means for generating the temperature difference comprises heating means for the scale carrier member.

50. The position measuring device according to claim 49, wherein the scale carrier member comprises heating lines for supplying heating energy.

51. The position measuring device according to claim 48, wherein the means for generating the temperature difference comprises heating means for the scanning device.

52. The position measuring device according to claim 48, wherein the means for generating a temperature difference is a heating line in the scale.

53. The position measuring device according to claim 49, wherein the heating means comprises means for adjusting the dimensions of the scale carrier member.

54. The position measuring device according to claim 53, wherein the scanning device comprises heating lines, and sliding contacts for supplying heating current to the heating lines.

55. The position measuring device according to claim 48, the heated scale carrier member having ends, comprising fastening elements for tightly clamping the ends of the scale carrier member.

56. The position measuring device according to claim 55, comprising supply lines for supplying the heating current through the fastening elements.

* * * * *